May 22, 1928.
H. J. PAWLING ET AL
1,670,821
NONPULL PLUNGER FOR BOTTLE MAKING MACHINES
Filed June 19, 1925   2 Sheets-Sheet 1
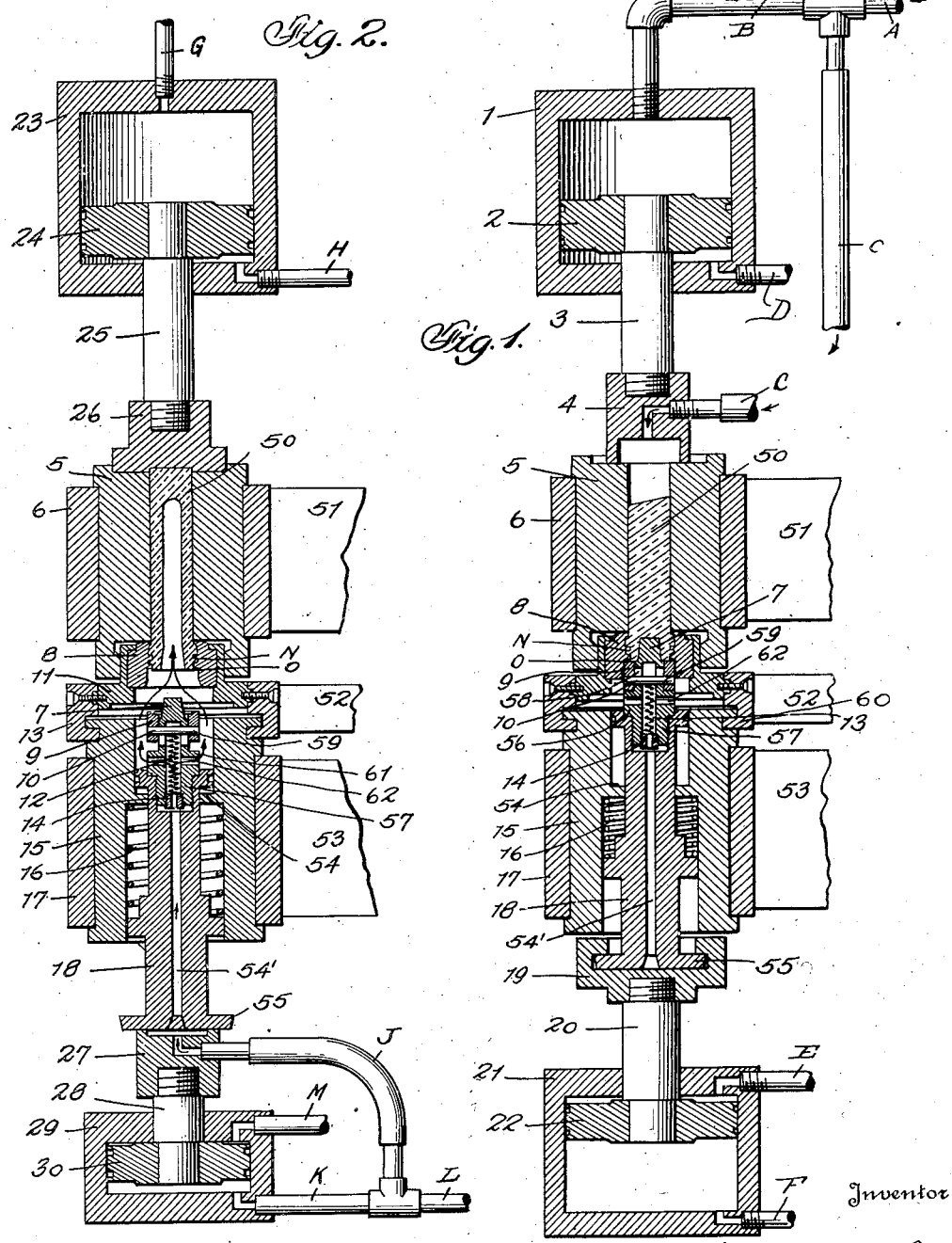
Inventor
H. J. PAWLING
H. A. CRISPIN.
By
Attorney May 22, 1928.

H. J. PAWLING ET AL 1,670,821

NONPULL PLUNGER FOR BOTTLE MAKING MACHINES

Filed June 19, 1925    2 Sheets-Sheet 2

Inventor
H. J. PAWLING and
H. A. CRISPIN

By Munson H Lane

Attorney

Patented May 22, 1928.

1,670,821

UNITED STATES PATENT OFFICE.

HENRY J. PAWLING AND HARRY A. CRISPIN, OF SALEM, NEW JERSEY, ASSIGNORS TO SALEM GLASS WORKS, OF SALEM, NEW JERSEY.

NONPULL PLUNGER FOR BOTTLE-MAKING MACHINES.

Application filed June 19, 1925. Serial No. 38,187.

The invention relates to glass bottle making, and has as its primary object to provide means for forming a seamless sealing surface or mouth upon a glass bottle. A further object is to provide means whereby a uniform distance may be maintained in all bottles between the point where the bottle closure or cap grips the bottle and the sealing surface of the bottle.

According to existing practice bottles made by machines frequently have irregular sealing surfaces, due to the adherence of the glass to the plunger as it is withdrawn during the blank and neck forming operations. In such cases it is difficult to form a tight seal or closure. The present invention eliminates this defect by providing a non-pull plunger which may be readily applied to existing machines. With the improved plunger it is found that smoothness of the sealing surface is secured and a uniform distance between the closure gripping surface and the sealing surface is maintained.

The invention will be more readily understood by reference to the accompanying drawings in which the non-pull plunger is shown in its preferred embodiment.

Fig. 1 is a view partly in section and partly in elevation, showing the improved plunger applied to a standard glass making machine, the neck forming operation being shown in the figure.

Fig. 1ª is a fragmentary view, showing the plunger tip withdrawn slightly from the position shown in Fig. 1.

Fig. 2 is a view similar to Fig. 1, but showing the bottle blank expanded.

Figure 1A:
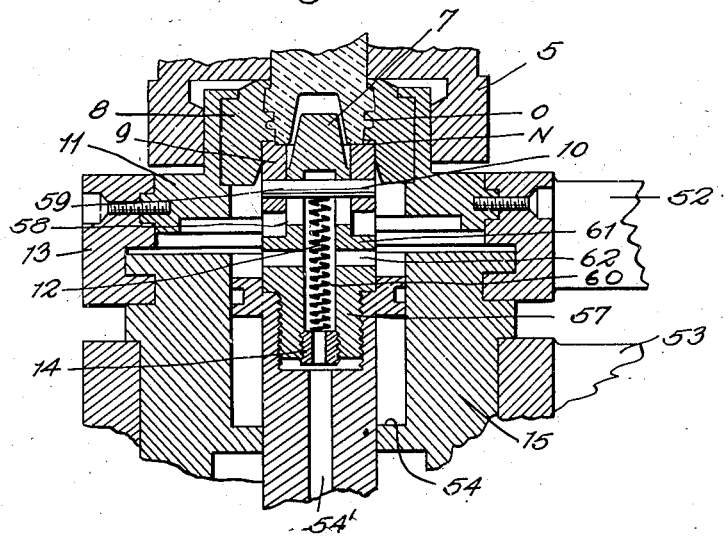
Figure 3:
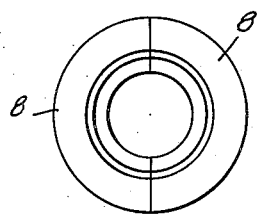
Fig. 3 is a detail view, showing the two-part neck ring.

For the purpose of illustration, the plunger is shown in Figs. 1 and 2 as applied to a glass blowing machine of standard construction. Such parts only of the machine as are necessary to an understanding of the present invention are shown in the drawings and a brief description of the operative features thereof will now be given.

Referring first to Fig. 1, the reference numeral 5 denotes a glass container or mold which has received its charge of glass 50 from above in the usual manner. The mold 5 is held in a carrier 6 having an arm 51 which is attached to a rotatable table (not shown). The mold 5 and the associated mechanism are moved from station to station by the carrier 6 in a well known manner, which it is unnecessary to describe in detail, as this forms no part of the present invention.

When in the position shown in Fig. 1, the glass container or press mold is directly beneath a blow head 4, shown in lowered position. The blow head is carried by the rod 3 of piston 2, which works in a cylinder 1, whose position is fixed. Air from a suitable source of pressure A is admitted through passage B above the piston 2, and a flexible branch pipe C leads to the blow head 4. Another pipe D communicates with the lower face of piston 2.

When the blow head 4 is in contact with the press mold 5, as shown, compressed air from the pipe C is admitted to the molten glass 50, compressing it so as to fit tightly within the mold.

Below the press mold 5 is a two-part neck or finishing ring 8, the parts of which are secured to a member 11, which in turn is secured to a carrier 13 having a rotatable arm 52. The carrier 13 likewise assists in supporting a cylinder 15 mounted in a carrier 17 having a rotatable arm 53. Within the cylinder 15 is mounted a plunger 18 having a central air passage 54'.

The plunger 18 is provided with a spring 16, one end of which engages a flange 54 located within the cylinder 17. The lower end of the plunger 18 is enlarged as at 55 and is adapted to be engaged by means of a drawbar 19 carried upon the upper end of a piston rod 20, the head 22 of which works in a suitable air cylinder 21 and is operated by compressed air admitted at E and F located respectively above and below the piston head.

It will be noted that all the parts referred to in the above description located between the blow head 4 and the drawbar 19 are carried by rotating arms and move at intervals from station to station, where the various operations of forming the bottle blank are performed. The cylinders 1 and 21, however, are stationary and the pistons 2 and 22 are reciprocated vertically therein, being brought into engagement with the parts carried by the rotating table at the proper instant to perform their respective functions.

The parts above described are or may be of standard construction and form part of a glass bottle making machine of standard type.

In addition to these elements, there is frequently provided a removable plunger head, which cooperates with the glass container 5 and neck mold 8 to form the complete neck mold, the molten glass being compressed tightly about the neck ring and plunger head. This plunger head, according to existing practice, is of one-piece construction, and when withdrawn the glass adheres to the plunger head, thus producing an uneven sealing surface upon the neck of the finished bottle.

Figure 4:
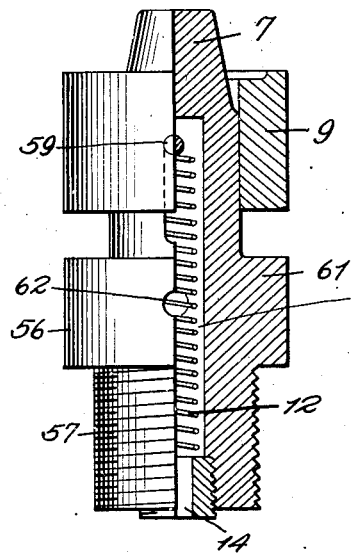
Fig. 4 is a detail view on an enlarged scale, showing the non-pull plunger.

The present invention overcomes this defect by providing a plunger head of special construction, as shown in Fig. 4. The plunger head consists of a body member 56 having a threaded stem 57 adapted to be screwed into the top of plunger 18 and having a plunger tip 7, about which, as shown in Fig. 1, the molten glass is pressed during the neck-forming operation. The plunger tip 7 is slotted, as at 58, and through this slot a pin 59 is passed by means of which a ring or sleeve 9 is attached to the plunger. As shown, the plunger body 56 is hollowed centrally, as at 60, and a strong compression spring 12 is mounted in the hollowed-out portion. One end of the spring 12 engages the pin 59, thereby tending to hold the sleeve 9 at its uppermost position. The lower end of the spring engages a centrally apertured plug 14 within the plunger body. The enlarged portion 61 of the plunger body 56 is provided with passages 62 communicating with the central passage 60 for a purpose to be described hereinafter.

The operation of the device will be evident from the foregoing description. After the glass has been poured into the mold and pressed firmly about the neck ring 8, the plunger tip 7 and sleeve 9, air pressure from beneath piston 22 is cut off and air admitted from above at E, thus withdrawing the piston. Due to the action of the spring 12, the sleeve 9 is held in contact with the glass at the sealing surface O for an instant after the plunger tip 7 begins to withdraw. See Fig 1ª. In this manner the adhesion of the glass is broken, and when the sleeve 9 is finally withdrawn a smooth seamless surface remains upon the bottle neck, and a uniform distance between the sealing surface O and the closure grip surface N is assured for all bottles made with a given plunger head and neck ring.

At the completion of the operation just described that part of the apparatus between the blow head 4 and the drawbar 19 is rotated to the position shown in Fig. 2, where the blank-forming operation is completed. At this station a holding plate 26 is lowered into contact with the top of the mold 5 by means of a piston 24 secured to said plate by a rod 25, and operating in a stationary cylinder 23. Compressed air for operating said piston may be admitted at G and H located respectively above and below the piston head.

Below the rotating parts is located another cylinder 29, within which is a piston 30 which is connected to a blow head 27 by means of a piston rod 28. Compressed air for operating the piston may be admitted at L and M above and below the piston head. Compressed air from any suitable source of supply is admitted to the blow head through a flexible pipe J. The plunger 18 is held firmly in contact with the blow head by means of the coil spring 16.

Compressed air from the blow head now passes through the central opening 54 in plunger 18 and through passages 60 and 62 in the plunger head 56, thence around the plunger head and into the bottle blank 50, which is thus expanded to the form shown in Fig. 2.

This operation having been completed the blank is subjected to the other well known operations until the finished bottle is obtained.

Figure 5:
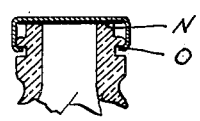
Fig. 5 is a view showing one of the bottles produced by the use of the improved plunger.

The bottle, as shown in Fig. 5, is provided with a threaded neck, due to the presence of corresponding threads in the neck mold. The sealing surface O of the bottle is perfectly smooth, due to the operation of the non-pull plunger, and the threads N or closure-gripping surface are at a predetermined distance from the sealing surface. In this manner an air-tight fit is assured when the cap or closure P is applied to the bottle.

What we claim is:—

1. For use in glass bottle-making machines, a removable plunger head, comprising a centrally apertured plunger body having a threaded stem adapted to be secured in a standard plunger, a slotted plunger tip integral therewith, a sleeve surrounding said tip and secured thereto by a pin and slot connection, and a compression spring mounted in the central aperture of said plunger body and reacting between said plunger body and said sleeve.

2. A non-pull plunger for glass bottle making, comprising in combination a plunger body having a plunger tip integral therewith, a central passage through said plunger body, a sleeve surrounding said tip and having a pin and slot connection therewith, a compression spring mounted in the central passage of said plunger body and bearing at one end against said pin, and at the other end against a projection in said central passage.

3. In a bottle-making machine, in combination with a mold adapted to receive a charge of glass for forming a bottle blank, a neck ring located adjacent said mold, a plunger head adapted to cooperate with said mold and neck ring for forming the bottle finish, and apertured to permit passage of air, said plunger head having a plunger tip integral therewith about which molten glass is adapted to be compressed, a sleeve surrounding said tip and having a pin and slot connection therewith and adapted to engage the sealing surface of the bottle blank, and a spring interposed between said tip and sleeve adapted to press said sleeve in contact with the said sealing surface momentarily after said plunger tip has been withdrawn.

4. In a bottle-making machine, in combination, a neck ring, a plunger cooperating with said neck ring to form a bottle finish, and means for forcing molten glass downwardly about said neck ring and plunger, said plunger comprising a plunger body, a plunger tip and a sleeve surrounding said tip, said sleeve and tip being adapted to engage said molten glass, a pin and slot connection between plunger tip and said sleeve, and a compression spring engaging said pin at one end and said plunger at the other, whereby when said tip is withdrawn the sleeve remains momentarily in contact with the molten glass.

5. In a glass bottle-making machine, in combination, a mold adapted to receive a charger of molten glass, a blow head about said mold, a neck ring and plunger adjacent said mold and cooperating to form a bottle finish when the charge is forced downwardly by said blow head, said plunger comprising plunger tip and sleeve having a pin and slot connection, means for holding said plunger tightly against the mold, resilient means interposed between said plunger tip and sleeve tending to force said sleeve upwardly against the molten charge, whereby when said holding means is released the sleeve is maintained momentarily in contact with the charge after the plunger tip has been withdrawn.

6. In combination with a glass bottle-making machine having a mold adapted to receive a charge of molten glass for forming a bottle blank, a neck ring located adjacent said mold, a reciprocable plunger having a removable plunger head therein adapted to cooperate with said neck ring to form the bottle finish, said plunger head being apertured to permit the passage of air therethrough, said plunger head comprising an enlarged body member having a reduced plunger tip integral therewith, adapted to extend into the glass in said mold, a sleeve of substantially the same diameter as said body member surrounding said tip and adapted to engage the sealing surface of said bottle blank, and a compression spring interposed between said sleeve and said plunger tip whereby said sleeve is momentarily maintained in contact with said sealing surface after the plunger tip is withdrawn.

7. In a glass bottle making machine, a removable plunger head comprising a threaded plunger body adapted to be secured in a standard plunger, said plunger and plunger body being centrally apertured to permit through passages of air, a plunger tip of reduced diameter integral with said plunger head, and a sleeve of substantially the same diameter as said body member encircling said plunger tip and resilient means urging said sleeve toward the free end of the tip.

8. In a bottle making machine, in combination, a neck ring, a plunger cooperating with said neck ring to form a bottle finish, and means for forcing molten glass downwardly about said neck ring and plunger, said plunger being centrally apertured to permit passage of air, said plunger having a removable plunger head comprising an enlarged plunger body apertured to permit passage of air, a plunger tip integral with said plunger body of reduced diameter, a sleeve of substantially the same diameter as said plunger tip encircling said tip and axially movable relative thereto, and resilient means urging said sleeve toward the free end of the tip.

9. For use in glass bottle-making machines, a non-pull plunger comprising an enlarged plunger body, a reduced plunger tip integral with the plunger body, a sleeve encircling said tip of substantially the same diameter as said plunger body, and means for urging said sleeve toward the free end of the tip.

10. For use in glass bottle-making machines, a removable plunger head, comprising an enlarged plunger body having a threaded nipple, a reduced plunger tip integral with the plunger body, a sleeve encircling said tip, of substantially the same diameter as said plunger body, and means urging said sleeve toward the free end of said tip.

11. For use in glass bottle-making machines, a plunger head having a slotted plunger tip integral therewith, a sleeve surrounding said tip and secured thereto by a pin and slot connection, and resilient means urging said sleeve toward the free end of said tip.

12. A non-pull plunger for glass bottle-making comprising in combination, an enlarged plunger body having a reduced plunger tip integral therewith, a central air passage through said plunger body and lateral openings through said plunger body communicating with said central opening, a sleeve of substantially the same diameter as said plunger body, encircling said tip, and resilient means urging said sleeve toward the free end of the tip.

In testimony whereof, we affix our signatures.

HENRY J. PAWLING.
HARRY A. CRISPIN.